United States Patent [19]

Seto et al.

[11] Patent Number: 4,695,964

[45] Date of Patent: Sep. 22, 1987

[54] IMAGE CORRECTION PROCESSING METHOD

[75] Inventors: Youichi Seto, Hadano; Koichi Homma, Sagamihara; Fuminobu Komura, Yokohama; Hideo Ota, Hitachi, all of Japan

[73] Assignee: Hitachi, Ltd., Tokyo, Japan

[21] Appl. No.: 676,921

[22] Filed: Nov. 30, 1984

[30] Foreign Application Priority Data

Dec. 2, 1983 [JP] Japan ................................. 58-226857

[51] Int. Cl.$^4$ .......................... G01C 7/02; G03B 27/68; G06F 15/31
[52] U.S. Cl. .................................... 364/518; 358/109; 364/571
[58] Field of Search ........................ 364/514, 518, 571; 343/5 CM; 358/109; 382/42, 54; 355/52; 356/1, 2

[56] References Cited

U.S. PATENT DOCUMENTS

| | | | |
|---|---|---|---|
| 3,560,642 | 2/1971 | Schroader et al. | 358/109 |
| 3,676,581 | 7/1972 | Swet | 358/109 X |
| 3,716,669 | 2/1973 | Watanabe | 358/109 |
| 3,718,756 | 2/1973 | Watanabe | 358/109 |
| 3,952,151 | 4/1976 | Jenkin | 358/109 |
| 4,245,254 | 1/1981 | Svensson et al. | 358/109 X |
| 4,313,678 | 2/1982 | Colvocoresses | 356/2 |

OTHER PUBLICATIONS

Tsuchia et al.: High Precision All Digital LANDSAT Image Data Processing Techniques, Hitachi Review, vol. 29, No. 5, 1980, pp. 267-272.

Ihara et al.: High Precision Modeling of LANDSAT Imagery Distortion, ISTC, Jul. 1982, pp. 1-18.

*Primary Examiner*—Felix D. Gruber
*Attorney, Agent, or Firm*—Antonelli, Terry & Wands

[57] ABSTRACT

Distortion models consisting of two forward and backward reciprocating planes that let a corrected image correspond to an uncorrected image for each scanning direction are constituted to let an uncorrected satellite image scanned by a reciprocating scanning sensor with scanning overlap or scanning underlap correspond to a corrected image after distortion correction, by means of a continuous mapping function on a 1:1 basis. It is determined whether each point on the corrected image is a point on an overlapping scan or on an underlapping scan or on a normal scan from the existence of a real point on the distortion models.

4 Claims, 4 Drawing Figures

IMAGE CORRECTION PROCESSING METHOD

BACKGROUND OF THE INVENTION

1. Field of the Invention

This invention relates to an image correction processing method for a satellite image having geometric distortion, and more particularly to a correction processing method for the image obtained by a sensor TM (Thematic Mapper; optical sensor) mounted on the Landsat 4 Satellite.

2. Description of the Prior Art

Scanning error resulting from orbit and attitude fluctuation in the conventional satellite image is within the allowable error inside a model, and correcting scanning error is not taken into consideration because scanning is unidirectional scanning as typified by MSS (multispectral scanner) and resolution is as low as 2.7× when compared with a TM sensor.

Therefore, the prior art technique involves a problem in that in a model (mapping function) which gives correspondence between corrected image coordinates and uncorrected image coordinates; the mapping function is discontinued at the positions where a scanning error exists; hence, the image cannot be expressed at said error positions.

SUMMARY OF THE INVENTION

The present invention is directed to providing a correction processing method which can easily distinguish scanning distortion caused by overlap or underlap between points on the satellite image read by a reciprocating scanning sensor.

To accomplish the object described above, the present invention constitutes two uncorrected image coordinate systems for forward and backward scanning directions, respectively, in which the corrected image coordinates correspond to the uncorrected image coordinates for the scanning directions, and which carries out processing in such a manner that if no real point is found on either of the two uncorrected image coordinate systems for a point on the corrected image, the point is judged to be on an underlapping scan; or, if a real point is found on both uncorrected image coordinate systems, the point is judged to be on an overlapping scan; and finally, if a real point is found on only one of the two uncorrected image coordinate systems, the point is judged to be on a normal scan.

DESCRIPTION OF THE PREFERRED EMBODIMENTS

Figure 1:
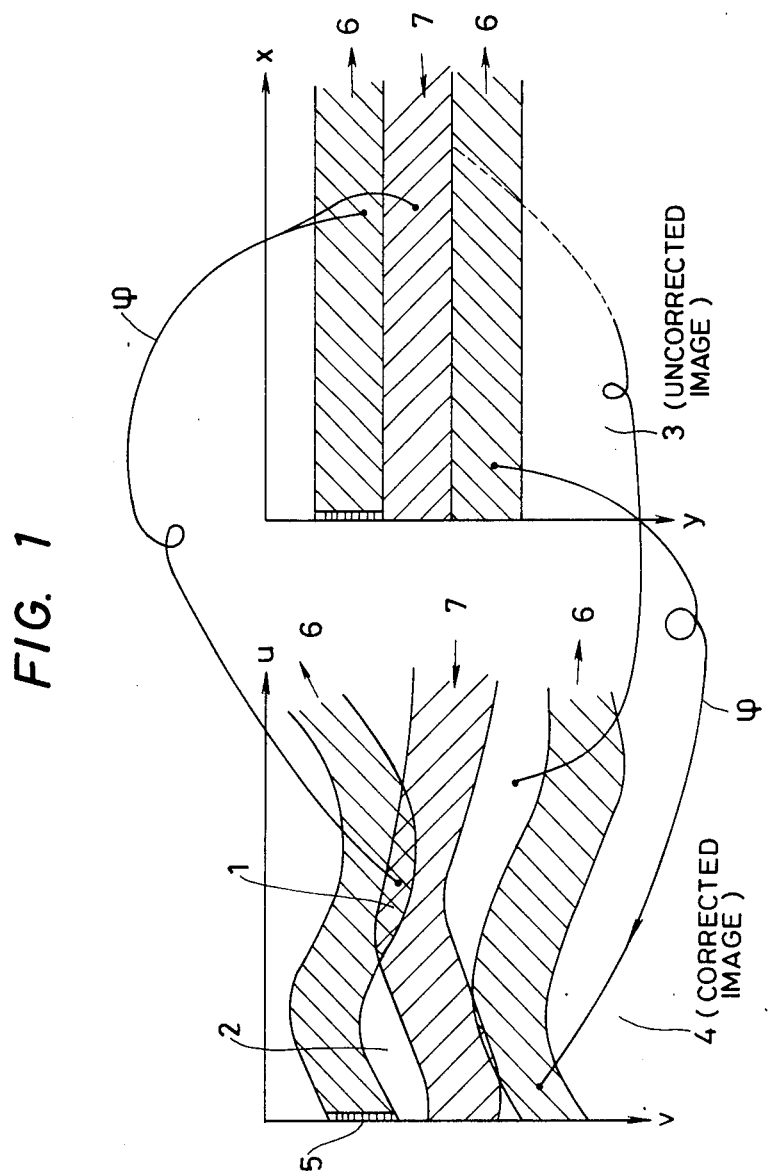
FIG. 1 shows a conventional system representing a corrected image coordinate system and an uncorrected image coordinate system.
Figure 2:
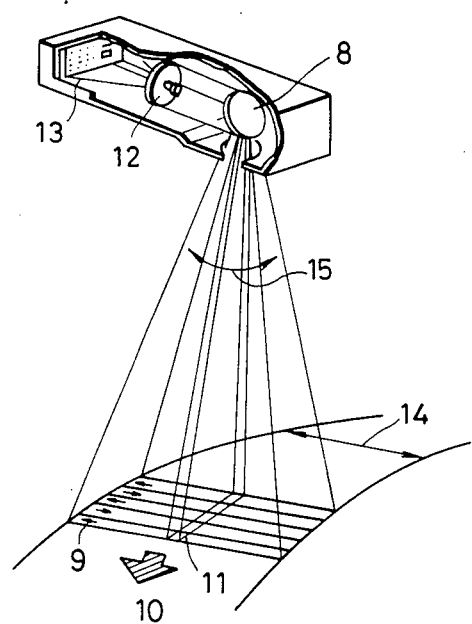
FIG. 2 shows the Landsat 4 Satellite schematically.

First of all, we will consider the reason why conventional distortion correction systems can not judge and correct scanning error (overlapping scan 1 and underlapping scan 2 shown in FIG. 1) distortion with reference to FIGS. 1 and 2. FIG. 2 shows the outline of the Landsat 4 Satellite TM sensor. An oscillating scanning mirror 8 reciprocatingly scans the ground surface in the direction corresponding to that indicated by an arrow 9 to take photographs of the ground surface. The image obtained by photographing the ground surface exhibits differences between forward scanning 6 and backward scanning 7 due to the attitude fluctuation of the scanning mirror and satellite as represented by the corrected image coordinate system 4 in FIG. 1. The following processes (1) through (3) are carried out in order to correct the received image.

(1) The mapping function $\phi$ representing geometric correspondence from the received uncorrected image coordinate system 3 to the corrected image coordinate system 4 is determined. The mapping function $\phi$ is determined from data such as the orbit attitude data of the satellite, the scanning angle, and the like.

(2) A representative point on the corrected image coordinate system 4 such as a point $(x_i, y_i)$ on the received image corresponding to the normal grid point $(u_i, v_i)$, for example, is obtained by repeated calculation of convergence of the mapping function $\phi$ (primarily because the inverse mapping function $\phi^{-1}$ can not be determined), and the points corresponding to those other than the representative point are interpolated to approximate the inverse mapping function $\phi^{-1}$.

(3) The point of the corrected pixel position $(u, v)$ is obtained from the corresponding point $(x, y)$ with the approximate inverse mapping function $\phi^{-1}$, and the surrounding received image data is interpolated to obtain a corrected image intensity value, since its position does not generally correspond to the pixel position on the received image.

If the mapping function $\phi$ is continuous, the distortion correction processing described above can approximate the inverse mapping function $\phi^{-1}$ with an arbitrary level of accuracy by increasing the density of the representative point on the output image; hence, it does not present any problem. When the received image coordinate system 3 has an overlapping scan 1 or an underlapping scan 2, however, the mapping function $\phi$ is a many-to-one or a zero-to-one relation and approximation with the continuous function is impossible.

Hereinafter, one embodiment of the present invention will be described with reference to the reciprocating two-plane distortion model of the Landsat 4 Satellite by referring to FIGS. 3 and 4.

The mapping function $\phi$ representing the correspondence between the corrected image coordinate system 4 and the uncorrected image coordinate system 3 is the function that uses the attitude angle $\theta(t)$ of the satellite, the position $\gamma(t)$ and the scanning angle $\beta(t)$ as its variables. Mapping $\phi(x, y)$ from the uncorrected image coordinates $x-y$ to the corrected image coordinates $u-v$ can be expressed by the following formula. Here, $t$ represents the time, and is a function of the uncorrected image coordinates $x-y$ as $t=t(x, y)$:

$$(u, v) = \phi[\theta(t), \gamma(t), \beta(t)] \quad (1)$$

The present invention is practiced with the following [A] and [B].

[A]: Introduction of double mapping functions $\phi_1^{-1}$ and $\phi_2^{-1}$

Mapping $\phi^{-1}$ from the corrected image coordinate system $u-v$ to the uncorrected image coordinate system x−y is not 1:1 mapping on the TM image for the following reasons (1) and (2).

(1) There is a region $\Omega_1$, scanning overlap region, on the corrected image where mapping is a one-to-many relation.

(2) There is a region $\Omega_2$, the scanning underlap region, on the corrected image where no corresponding point exists on the uncorrected image coordinate system x−y.

Therefore, the present invention considers the two coordinates systems $x_1-y_1$ and $x_2-y_2$ to be the uncorrected image coordinate system 3.

Figure 3:
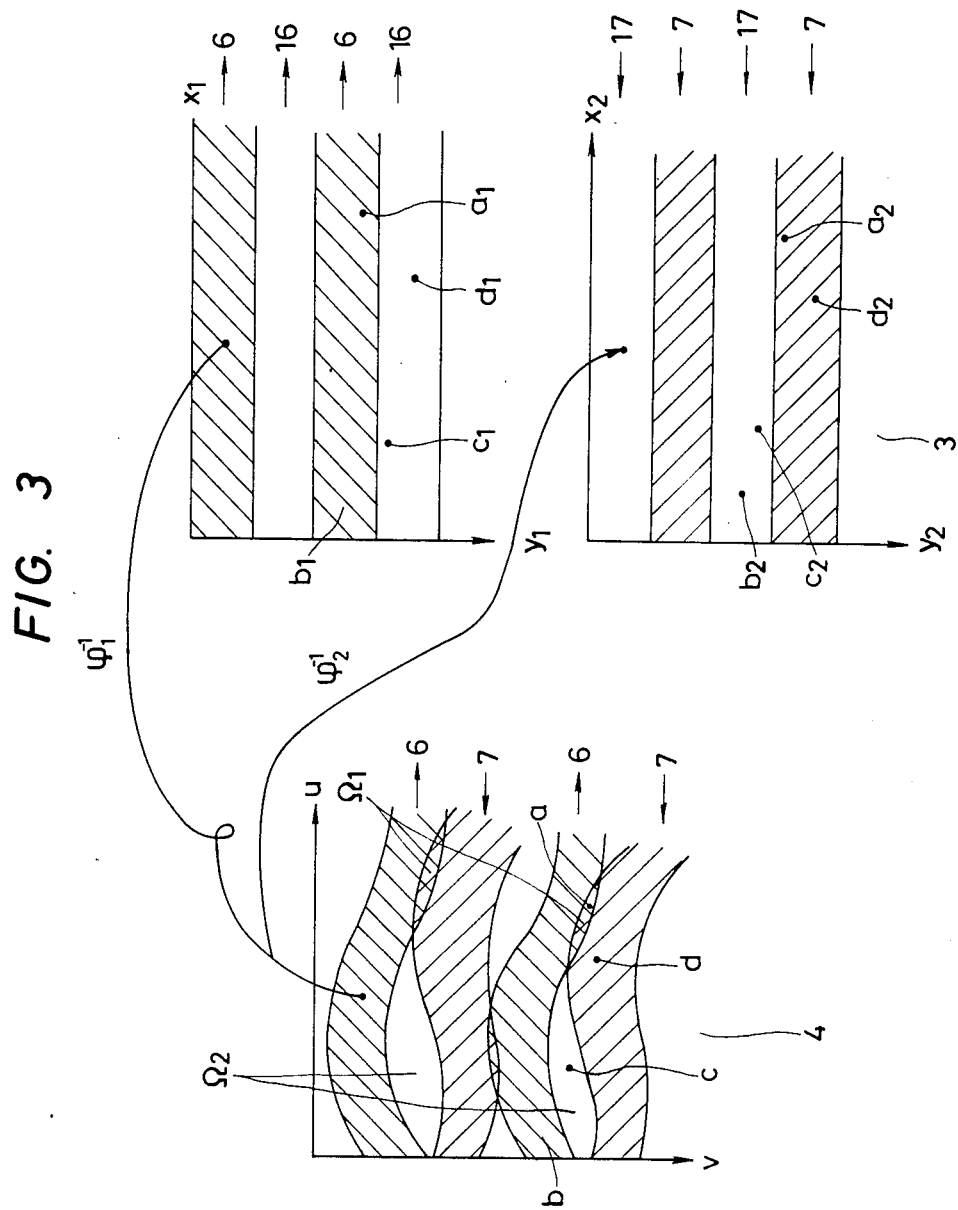
FIG. 3 shows coordinate systems of the present invention representing a corrected image coordinate system and two uncorrected image coordinate systems.

These two coordinates are the following (a) and (b) are as shown in FIG. 3:

(a) The coordinate system $x_1-y_1$ formed by alternately coupling forward scanning data regions 6 and imaginary forward scanning data regions 16; and (b) The coordinate system $x_2-y_2$ formed by alternately coupling backward scanning data regions 7 and imaginary backward scanning data regions 17.

The two coordinate systems define two mappings $\phi_1^{-1}$ and $\phi_2^{-1}$ corresponding to $x_1-y_1$ and $x_2-y_2$, respectively. When carrying out imaginary forward (backward) scanning, mapping is obtained by proceeding as if scanning were made in practice forward (or backward) scanning with forward (or backward) scanning characteristics. Therefore, mappings $\phi_1^{-1}$ and $\phi_2^{-1}$ are continuous, 1:1 mapping functions.

The following can be judged from the relation between four kinds of points a, b, c, d on the corrected image coordinate system 4 and the corresponding points $a_1$, $b_1$, $c_1$, $d_1$, $a_2$, $b_2$, $c_2$, $d_2$ on the uncorrected image:

(i) The points $a_1$, $a_2$ corresponding to the point a on the scanning overlap region $\Omega_1$ exist in the practical image data regions 6, 7 on the uncorrected image coordinate system 3; and (ii) The points $c_1$, $c_2$ corresponding to the point c on the scanning underlap region $\Omega_2$ exist in the imaginary image data regions 16, 17 on the uncorrected image 2.

Figure 4:
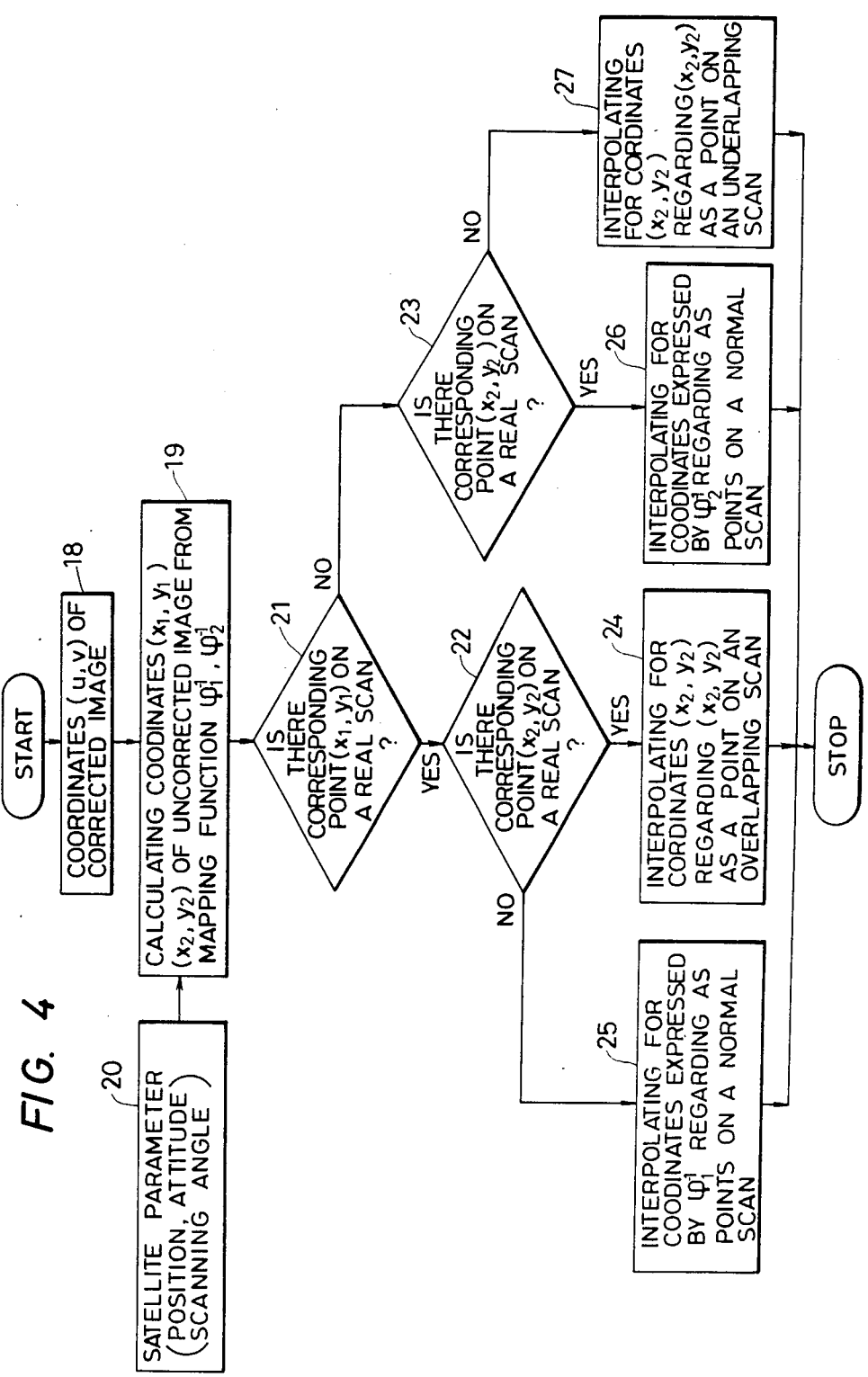
FIG. 4 shows a flow chart for correction processing of the Landsat 4 Satellite TM image in accordance with the corresponding two-plane distortion model system.

[B] Introduction of the reciprocating two-plane distortion model correction system:

FIG. 4 shows the flow of the reciprocating two-plane distortion model correction processing.

Step 18: The coordinates (u, v) on the corrected image coordinate system 4 are determined.

Step 19: The corresponding points $(x_1, y_1)$, $(x_2, y_2)$ on the uncorrected image coordinate system 3 are determined from the point (u, v) on the corrected image coordinate system 4 by mapping $\phi_1^{-1}$ (u, v) and mapping $\phi_2^{-1}$ (u, v). The satellite parameter data 20 are used when determining the mapping $\phi_1^{-1}$ and $\phi_2^{-1}$.

Step 20: Data such as the satellite position, the attitude, the scanning angle of the sensor, and the like are calculated.

Step 21: It is determined whether or not the corresponding point $(x_1, y_1)$ exists on a real scan. If it does step 22 is followed, and if not, step 23 is followed.

Step 22: It is determined whether or not the corresponding point $(x_2, y_2)$ exists on the real scan. If it does step 24 is followed and if not, step 25 is followed.

Step 23: It is determined whether or not corresponding point $(x_2, y_2)$ exists on the real scan. If so, step 26 is followed and if not, step 27 is followed.

Step 24: Interpolation is made assuming that the point exists on an overlapping scan.

Step 25: Interpolation is made assuming that the point exists on a normal scan of the coordinates expressed by $\phi_1^{-1}$.

Step 26: interpolation is made assuming that the point exists on a normal scan of the coordinates expressed by $\phi_2^{-1}$.

Step 27: Interpolation is made assuming that the point exists on an underlapping scan.

After the procedures described above have been carried out for all points (u, v) on the corrected image, geometric distortion taking the scanning error into consideration can be corrected.

The present invention is particularly effective for detecting scanning error when correcting a satellite image having geometric distortion such as scanning overlap or underlap resulting from reciprocating scanning.

What is claimed is:

1. A satellite image geometric correction processing method for use in an image correction system for correcting distortion in an image produced by displaying received data resulting from reciprocating scanning of an image detecting device mounted on a satellite, comprising the steps of:

establishing a first coordinate system for a corrected image;

allocating data signals representing received image data to second and third coordinate systems to provide uncorrected images for the forward and backward scanning directions of said image detecting device, respectively;

locating the respective coordinate points of the received image data in said second and third coordinate systems which correspond to the points of said first coordinate system;

determining for each point of said first coordinate system whether or not the corresponding points of said second and third coordinate systems exist on a scanning region in the respective coordinate system;

determining the intensity of image data at a point of said first coordinate system through interpolation by assuming that the point exists on an underlapping scanning region when the corresponding coordinate point of said second and third coordinate system does not exist on a scanning region of either of said second and third coordinate system; and visually producing the corrected image data in said first coordinate system on the basis of the determined intensity of each point therein.

2. A satellite image geometric correction processing method according to claim 1, which further comprises a step of determining the intensity of image data at a point of said first coordinate system through interpolation by assuming that the point exists on an overlapping scanning region when the corresponding coordinate points of said second and third coordinate systems exist on a scanning region of both of these coordinate systems.

3. A satellite image geometric correction processing method according to claim 2, wherein said second coordinate system is formed by alternate forward scanning data regions and imaginary forward scanning data regions and said third coordinate system is formed by alternate backward scanning data regions and imaginary backward scanning data regions.

4. A satellite image geometric correction processing method according to claim 1, wherein said second coordinate system is formed by alternate forward scanning data regions and imaginary forward scanning data regions and said third coordinate system is formed be alternate backward scanning data regions and imaginary backward scanning data regions.

* * * * *